United States Patent [19]

Berman et al.

[11] Patent Number: 5,797,023

[45] Date of Patent: Aug. 18, 1998

[54] METHOD AND APPARATUS FOR FAULT TOLERANT BIOS ADDRESSING

[75] Inventors: Rachael Berman, Maynard; Stephen F. Shirron, Acton; Fidelma Hayes, Marlborough; Kevin Peterson, Sudbury; Marco Ciaffi, Hudson, all of Mass.

[73] Assignee: Digital Equipment Corporation, Maynard, Mass.

[21] Appl. No.: 891,249

[22] Filed: Jul. 10, 1997

Related U.S. Application Data

[63] Continuation of Ser. No. 324,198, Oct. 17, 1994, abandoned.

[51] Int. Cl.[6] .................................................. G06F 1/28
[52] U.S. Cl. .................... 395/750.06; 395/651; 395/653; 395/183.12
[58] Field of Search .................... 395/750.06, 651, 395/652, 183.12, 183.18, 185.11, 653

[56] References Cited

U.S. PATENT DOCUMENTS

| | | | |
|---|---|---|---|
| 4,491,914 | 1/1985 | Sujaku | 364/200 |
| 4,590,557 | 5/1986 | Lillie | 364/200 |
| 5,220,667 | 6/1993 | Ichieda | 395/700 |
| 5,237,687 | 8/1993 | Okamoto et al. | 395/700 |
| 5,263,168 | 11/1993 | Toms et al. | 395/700 |
| 5,307,497 | 4/1994 | Feigenbaum et al. | 395/700 |
| 5,325,532 | 6/1994 | Crosswy et al. | 395/700 |
| 5,327,531 | 7/1994 | Bealkowski et al. | 395/164 |
| 5,355,489 | 10/1994 | Bealkowski et al. | 395/700 |
| 5,381,549 | 1/1995 | Tamura | 395/700 |
| 5,388,267 | 2/1995 | Chan et al. | 395/700 |

*Primary Examiner*—Emanuel Todd Voeltz
*Assistant Examiner*—Michael T. Richey
*Attorney, Agent, or Firm*—David Suhl; Diane C. Drozenski; Ronald C. Hudgens

[57] ABSTRACT

An apparatus is described to provide a fault tolerant power-on of a computer system, using a BIOS memory containing a primary power-on system level configuration program for a computer system and a separate memory which contains a subset of the primary power-on system level configuration program. The subset program is accessed automatically, without human intervention, responding to a checksum detector of the BIOS memory data.

4 Claims, 3 Drawing Sheets

METHOD AND APPARATUS FOR FAULT TOLERANT BIOS ADDRESSING

This application is a continuation, of application Ser. No. 08/324,198, filed Oct. 17, 1994, now abandoned.

BACKGROUND OF THE INVENTION

This invention relates generally to computer systems and more particularly to the automatic configuration of computer systems during start up or power-on, generally known as 'booting'.

As is known in the art, 'start-up' of a computer system often includes supplying information, called a system level configuration program, to a processor to initialize various subsystems within the computer system. Typically, the system level configuration program is stored in Read Only Memories (ROMs), because ROMs are memories that do not lose their stored information when the system power is shut off, as opposed to the other types of memory such as RAMs. Despite the name, Read Only Memory, typical modern ROMs can be erased and rewritten. Examples of this type of Read Only Memory include Electrically Alterable ROM (EAROM), Ultraviolet Erasable Programmable ROM (UVPROM), Electrically Erasable Programmable ROM (EEPROM), and a special type of EEPROM the Flash ROM. It is customary for the system level configuration program to be rewritten whenever there has been an updated version released, and the system start up program is consequently different than before.

The system level configuration program typically includes programs to check the system, determine what types of devices are actually present in the system, and determine system information such as what format video display is being used, for example EGA, VGA or SVGA; what type of network communication standards are in use, which version of the keyboard is attached to the system, what network adapters and storage adapters are present, etc. The system configuration level program contains information for device drivers for all supported devices. The system configuration level program installs the appropriate drivers for the devices actually present on the system at start up. The device drivers are programs which permit the particular device to interface with the computer system. Without configuration information the computer does not have the ability to communicate with the user or with any other computer on a network on which the computer is connected. That is, the computer is in an inoperable state.

A problem known in the industry is that if there is an error introduced into the power-on information (generally known as BIOS data) stored in the ROMs, then the computer system may not be able to start-up properly and will be in a non-operative state. If the BIOS data error is introduced into the ROM while the system is already in operation, as is usually the case, then the error will not have any affect on the operation of the system until the next attempt to power the system up. Since there is no way for the computer to communicate with the user during a failed power-on operation, there is consequently no information for the user to use to analyze the cause of the failed power-on operation, and there is no way to use the system itself in manual mode to try and solve the start up problem, or to use the system in manual mode to try and make the necessary connections to properly configure the system. In the case where the data error occurs in a portion of the BIOS data that is not necessary for such basic system operations such as keyboard entry or Video Terminal interface, then the user would not have any information that an error in the power-on program had occurred, and hence would take no action to correct the hidden failure, until there is an attempt by the system of access the operational area affected by the error.

There are many ways by which incorrect data can be accidentally inserted into the non-volatile BIOS data. Typically, state of the art system level configuration program ROMs are of the IC type known as FLASH ROM. The most common cause of ROM data error is a power or voltage surge or spike that occurs during a system level configuration program update. Another common method of data error introduction is user error, such as accidently hitting a key during a routine system level configuration program update, despite the typical presence of an on screen warning to avoid hitting any key during the update. Another method by which a data error can arise is due to failure of the ROM from intrinsic manufacturing faults that cause current leakage, which will eventually convert a stored logical '1' into a logical '0', thus corrupting the system level configuration program data stored in the non volatile BIOS ROMs.

An approach known in the art to partly solve the problem of an error introduced into the power-on system level configuration program stored in the BIOS ROMs is to do a 'checksum' calculation on the BIOS data and check that the value derived is correct. If an error is found in the checksum, an error is reported to the user. The user would typically then manually restart the system with a known good copy of the BIOS data inserted into the floppy disk drive, or through some other manual intervention. This approach has the problems of requiring manual intervention, and of requiring a level of operator sophistication frequently not found.

Another approach known in the art which solves some of the problem mentioned above, involves using the checksum calculation, giving an error report if the result is incorrect, and then attempting to install the BIOS data despite the known error. The success of this method depends on the data error occurring in a part of the BIOS data that is not critical to the basic operation of the system, so that the system runs sufficiently well that the system itself can be used to correct the BIOS data error via keyboard data entry. This approach has the advantage of not requiring physical intervention, but does require an even higher level of operator sophistication, and still involves a manual operator intervention.

Yet another method known in the art involves having two sets of BIOS ROMS with the same data, one set serving as a backup to the other. Upon finding a data error in one set of ROMs, the user physically opens the system and either inserts a shorting jumper wire, or else flips a switch on one of the system module boards to enable the alternate ROMS. This approach still requires a physical intervention by the system user and is also expensive, since it requires two complete sets of BIOS chips.

All of the above mentioned prior art methods of correcting data errors in the power-on program require manual intervention by the system user. Further, none of the above mentioned methods provides a solution to the system power-on problem in the case where the system failure is due to errors in the device drivers themselves. This case requires bringing up the system with only the most basic drivers necessary for system communication, and then using the system itself to reconfigure the bad drivers.

Thus there is a need in the art for a fault tolerant start-up program that can automatically without human intervention respond to errors in the start up data stored in the Read Only Memory (ROM) integrated circuit chips in a computer system.

SUMMARY OF THE INVENTION

In accordance with the present invention, an apparatus for providing a fault tolerant system for performing the power-on program for a computer system includes a memory containing a primary power-on system level configuration program for a computer system and a separate memory which contains a subset of the primary power-on system level configuration program. Such apparatus also includes means, responsive to a signal indicating a failure of the primary memory program, for automatically accessing the separate memory to provide the subset of the system level configuration program to the computer system.

With such an arrangement the normal computer start-up program can automatically, and without human intervention, respond to errors in the start up data stored in the Read Only Memory (ROM) integrated circuit chips in a computer system, and thus prevent a data error from becoming an inoperative computer situation.

BRIEF DESCRIPTION OF THE DRAWINGS

The above and further advantages of the invention may be better understood by referring to the following description in conjunction with the accompanying drawings, in which.

DESCRIPTION OF THE PREFERRED EMBODIMENTS

Figure 1:
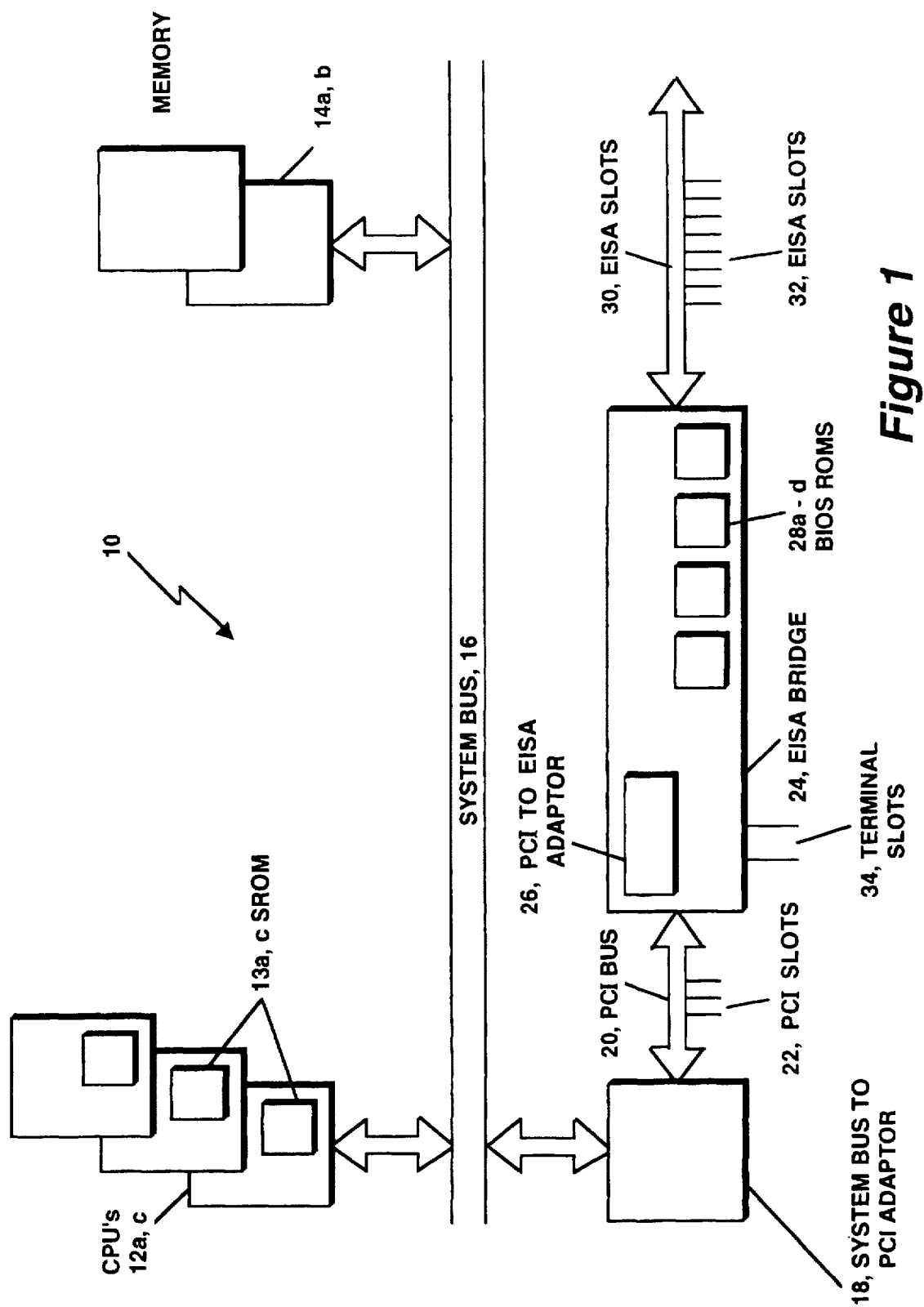
FIG. 1 is a block diagram of a computer system in accordance with the present invention.

Referring to FIG. 1, a computer system 10 is shown, to include a plurality of Central Processing Units (CPUs) 12, each of which contain a small Serial Read Only Memory (SROM)13, and a plurality of memory boards 14, interconnected via a system bus 16. The system bus 16 also interconnects a Peripheral Component Interconnect, "PCI", adaptor 18 to the computer system. The "PCI" adaptor 18 connects the system bus 16 to a so called "PCI" bus 20 and to various other peripheral devices (not shown) which occupy "PCI" slots 22. One of said "PCI" slots 22 is a special slot which is used by a "PCI" to Extended Industry Standard Architecture (EISA) Bridge interface board 24, containing an EISA adaptor circuit 26 and BIOS ROMs 28, for connection to an EISA communications bus 30 and to various other peripheral devices (not shown) which occupy EISA slots 32.

In a system of the type shown, a power-on system sequence would begin by the CPU boards 12 reading data in the small SROMs 13 in the first CPU slot, and using the configuration data in the SROM 13 to provide a pathway through the interface 18 and the "PCI" bus 20 to the EISA bridge circuit 24 to obtain data from the BIOS Flash ROMs 28a–28d.

Figure 2:
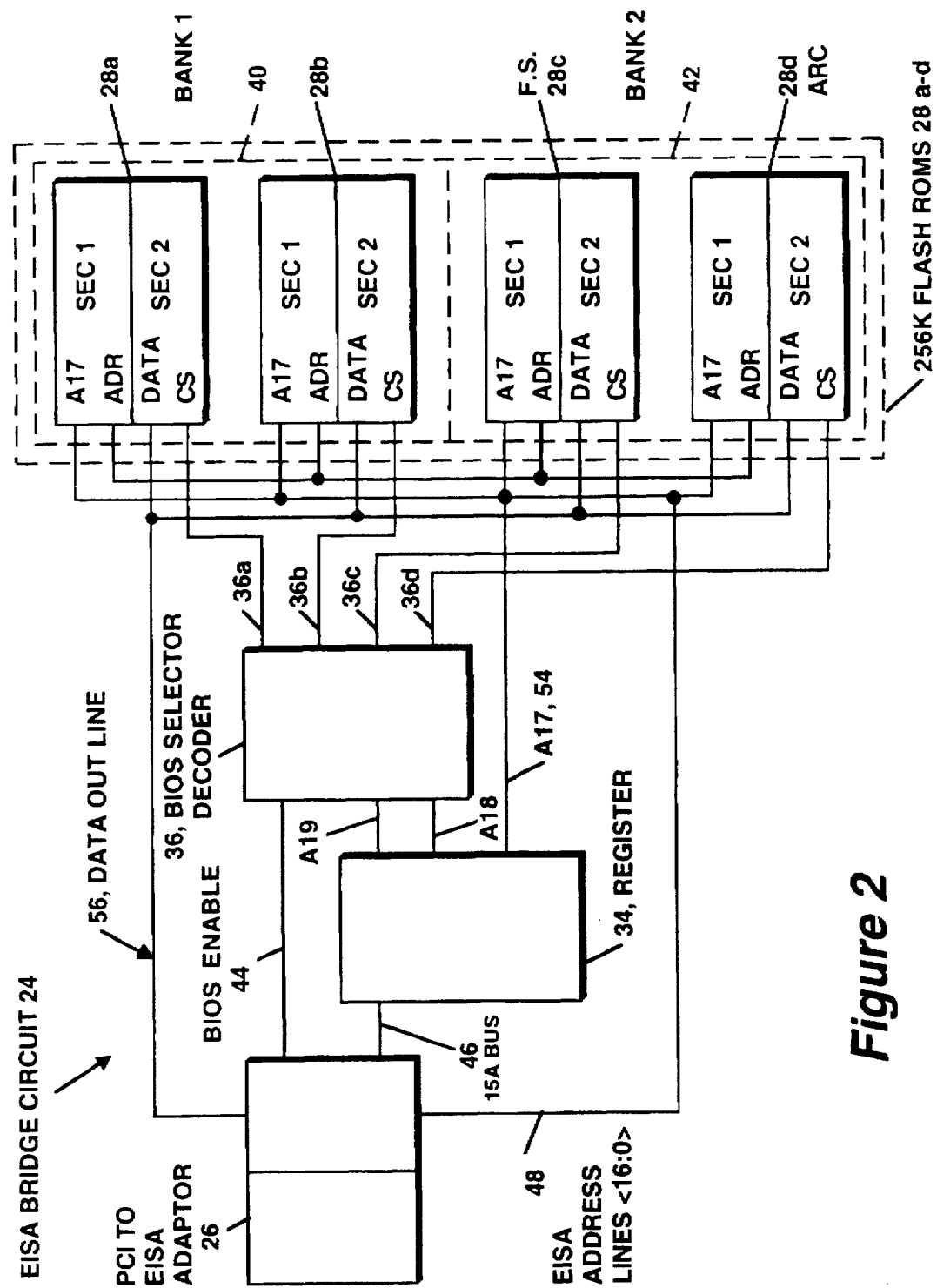
FIG. 2 is a block diagram of the BIOS Flash ROMs and control logic.

Referring now to FIG. 2, the BIOS addressing logic of the EISA Bridge Interface board 24 is shown in more detail. The EISA Bridge Interface board 24 contains the PCI to EISA Adaptor Chips 26 connected to the eight bit register 34 and the BIOS Chip Select Logic 36 for connection to a plurality of Flash ROMs 28a–28d. The Flash ROMs (ie Flash memory) are divided into two groups of two memories in this illustrative embodiment of the invention, and are connected through data out line 56 back to the PCI to EISA Adaptor 26. Flash memories 28a and 28b together comprise bank 1 40 which contain data known as the System Level Configuration Program, while Flash memories 28c and 28d together comprise bank 2 42. Memory 28c contains Fail Safe (FS) or back up power-on configuration data, whereas the fourth Flash memory 28d in this illustrative embodiment of the invention contains power-on set up information for any alternative operating systems that the computer system may be using in addition to the main operating system.

Here, each of the Flash memory ROMs 28a–28d typically contains 256K bytes of data divided into two 128K byte data sections. Each of the eight data sections is addressed by enabling the BIOS Chip select logic 36 with the BIOS Enable signal 44, and with the three bits A17, A18 and A19 provided via the Industry Standard Architecture (ISA) Bus 46 to register 34. The three bits A17, A18 and A19 are pseudo address bits that complement the seventeen address bits A0 through A16 provided by the PCI to EISA adaptor 26 via the EISA address line 48. Seventeen address bits provide the ability to address 128K of memory, thus the three extra pseudo address bits are required to address the full Megabyte of Flash memory needed for this illustrative embodiment of the present invention. The data in the addressed one of the eight data sections is sequentially read, using the seventeen bit EISA Address Bus 48 for byte resolution. The addressing of the eight data sections is shown in Table 1, wherein it shows that the A19 signal enables either the first two Flash memories 28a and 28b, or the second two Flash memories, the Fail Safe (FS) memory 28c and the alternative operating memory 28d. The A18 signal enables either the first of the two selected Flash memories or the second of the two selected Flash memories. Finally, the A17 signal 54 enables either the first 128K bytes of the selected Flash memory or the second 128K bytes of data on the selected Flash memory. All of the above signals only operate with the BIOS ENABLE signal 44 being asserted.

TABLE 1

| BIOS CHIP SELECT LOGIC TRUTH TABLE | | | |
|---|---|---|---|
| A19 | A18 | A17 | DATA SECTION ENABLED |
| 0 | 0 | 0 | 1 of Flash memory 1 |
| 0 | 0 | 1 | 2 of Flash memory 1 |
| 0 | 1 | 0 | 1 of Flash memory 2 |
| 0 | 1 | 1 | 2 of Flash memory 2 |
| 1 | 0 | 0 | 1 of Flash memory 3 |
| 1 | 0 | 1 | 2 of Flash memory 3 |
| 1 | 1 | 0 | 1 of Flash memory 4 |
| 1 | 1 | 1 | 2 of Flash memory 4 |

Figure 3:
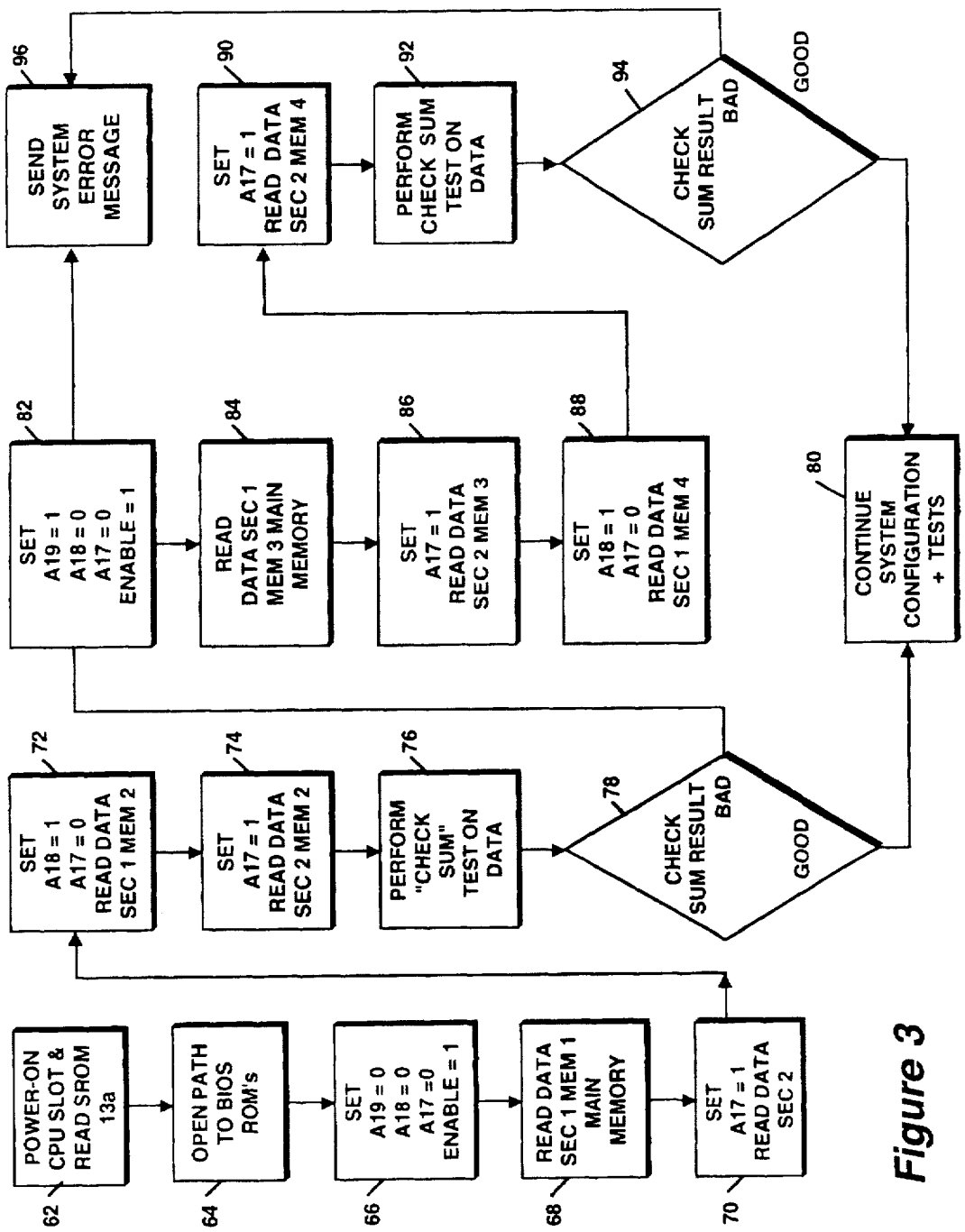
FIG. 3 is a flow chart of the logic used to implement the fault tolerant back up logic.

Referring now also to FIG. 3, in operation, the CPU 12 uses the data in the SROM 13 on the primary CPU 12, at step 62, to cause bridge circuit 26 to assert the BIOS ENABLE output signal 44, at step 66, on the PCI to EISA adaptor 26. This enables reading of data from section 1 of the first Flash memory 28a of data bank 1 40 by the address bus 48 into the appropriate area of the main memory 14 via the Data out lines 56 through the PCI to EISA adaptor 26, the PCI bus 20, the System bus to PCI adaptor 18 and the system bus 16, step 68. At this juncture the eight bit register 34 output signals, A19, A18 and A17 54 are all in their initial state, equal to zero.

As shown in Table 1, only data section 1 of the first Flash memory is enabled for A19, A18 and A17 equal to zero. In this manner, the first 128K bytes of system level configuration program data are sequentially read into the main memory 14, starting in this illustrative embodiment with location 8,000.

The next 128K bytes of the system level configuration program data are read when the microprocessor 12 provides a message to the eight bit ISA bus 46 having bit A17 at a logical one (step 70). This causes register 34 to assert the A17 output. As shown in Table 1, only data section 2 of the first Flash ROM is enabled for A19 and A18 equal to zero and A17 equal to 1, thus data section 2 is sequentially read into the next sequential area in the main memory 14, at step 70. Setting the A18 data bit on ISA bus 46 to logical one and A17 to logical zero causes register 34 to assert the A18 output signal, at step 72. This step, with the previously asserted BIOS ENABLE signal 44 causes the chip select logic unit 36 to enable Flash memory 2 28b. Reference to Table 1 shows that data section 1 of the second Flash ROM 28b is now enabled and sequentially read into the next sequential area in the main memory 14 in the same fashion as Flash memory one 28a above, with the same procedure used to load the second data section of Flash memory 28b, at step 74.

Thus, the data in the first two BIOS Flash ROMs 28a and 28b, data bank 1 40 (typically 512K bytes), known as the System Level Configuration Program is loaded into the appropriate main memory 14 location 128K Bytes at a time. This System Level Configuration Program data in the main memory 14 is used by the primary CPU of the system, and the desired arrangement of bus connections, interface formats and peripherals is assembled, tested and failure analyzed as necessary.

The first test done when the data is loaded is a data integrity test, at step 78. There are many possible data integrity tests, such as single bit parity checks, multiple bit parity checks, various data correction code methods, and the 'checksum'. In this illustrative embodiment of the invention, the check sum test is utilized. In the check sum test the total sum of all of the data is calculated and compared to the stored value. If the checksum value is not the same as the stored value, an error message 38 is generated by the primary CPU 12, at step 96, and the error message causes bits A17 and A18 to be set to a logical "0" and A19 to be set to a logical "1". With A19 at a logical "1" the chip select decoder 36 selects line 36c, as shown in Table 1, at step 82. Thus, the third Flash chip 28c, the Fail Safe (FS), is enabled, at step 84 and the power-on set up automatically proceeds exactly as before, steps 86-94, but now using the uncorrupted subset of the system level configuration program data contained in the second memory bank 42, which contains the FS chip, 28c.

This provides an automatic fail safe backup computer system power-on configuration program in the additional Flash BIOS ROM chip 28c. This fail safe backup BIOS ROM is automatically enabled when a fault in the primary power-on procedure is detected, thus the system requires no human intervention as do prior art fail over systems. Since the fail safe computer system power-on configuration program contains a subset of the power-on program, it is less likely to encounter start up problems than the primary computer system power-on configuration program, since there are fewer device drivers enabled by the subset program. The subset of the power on program used will contain only the most basic device drivers necessary for minimal system operation, such as the terminal driver, the keyboard driver and the memory adaptor. When the subset of the computer system power-on configuration program has the system running at some minimal level, the system itself can be used to failure analyze the original problem, and may even be used to correct system device driver software problems without having to restart the entire system. Thus in the event of an error in the system level configuration program data stored in BIOS Flash ROM, the system automatically goes into a fail safe backup program and alerts the user to the problem, while providing a tool for the user to analyze, and perhaps repair, the data error.

What is claimed is:

1. A method for providing a fault tolerant power-on of a computer system having a stored primary power-on system level configuration program, comprises the steps of:

accessing said primary power-on system level configuration program storage location;

performing a first check-sum calculation on said primary power-on system level configuration program;

executing said primary power-on system level configuration program to enable said computer system operations if said first check-sum operation indicates no failure in said primary power-on system level configuration program;

automatically accessing a secondary power-on system level configuration program storage location if said first checksum operation indicates a failure in said primary power-on system level configuration program data, and automatically notifying a system operator of said failure in said primary power-on system level configuration program;

performing a second check-sum calculation on said secondary power-on system level configuration program; and executing said secondary power-on system level configuration program to enable said computer system operations if said second check-sum operation indicates no failure.

2. The method of claim 1, wherein said secondary power-on system level configuration program is a sub-set of said primary power-on system level configuration program and is stored in a separate memory location.

3. The method of claim 2, wherein said secondary power-on system level configuration program stored in said separate memory location, is the smallest sub-set of said primary power-on system level configuration program necessary to achieve minimal system operation.

4. The method of claim 1, wherein said secondary power-on system level configuration program is stored in a physically different memory structure than said primary configuration program.

\* \* \* \* \*